United States Patent [19]

Dolev

[11] Patent Number: 5,029,159
[45] Date of Patent: Jul. 2, 1991

[54] METHOD AND MEANS FOR LEADER CHOOSING ON A TOKEN RING SYSTEM

[75] Inventor: Danny Dolev, Cupertino, Calif.

[73] Assignee: International Business Machines Corporation, Armonk, N.Y.

[21] Appl. No.: 383,021

[22] Filed: Jul. 18, 1989

[51] Int. Cl.$^5$ .................................................. H04J 3/02
[52] U.S. Cl. ............................. 370/16.10; 370/94.10; 370/85.40; 370/85.50; 370/13; 340/825.05
[58] Field of Search ................. 370/85.5, 85.4, 85.12, 370/85.15, 16.1, 16, 13; 340/825.05

[56] References Cited

U.S. PATENT DOCUMENTS

| | | | |
|---|---|---|---|
| 4,293,948 | 10/1981 | Soderblom | 370/90 |
| 4,445,116 | 4/1984 | Grow | 340/825.05 |
| 4,494,233 | 1/1985 | Bahr et al. | 370/86 |
| 4,539,679 | 9/1985 | Bux et al. | 370/88 |
| 4,566,098 | 1/1986 | Grammage et al. | 370/85.5 |
| 4,593,280 | 6/1986 | Grow | 370/85.5 |
| 4,604,742 | 8/1986 | Hamada et al. | 370/85.5 |
| 4,860,284 | 8/1989 | Brown et al. | 370/85.5 |

FOREIGN PATENT DOCUMENTS

| | | | |
|---|---|---|---|
| 0228750 | 10/1986 | Japan | 370/85.4 |
| 0173942 | 7/1989 | Japan | 370/85.5 |

*Primary Examiner*—Benedict V. Safourek
*Assistant Examiner*—Dang Ton
*Attorney, Agent, or Firm*—Baker, Maxham Jester & Meador

[57] ABSTRACT

In a token ring transmission system, token loss causes selection of a leader terminal, which issues a new token. The leader terminal is chosen by selecting and storing a leadership selection reference value and then generating a succession of terminal identification signals and transferring them on the token ring transmission system. Each terminal receives the succession of signals and iteratively compares the terminal identification signals sequentially with the leadership reference signal. Each time a terminal identification signal exceeds the magnitude of the leadership reference signal, the leadership reference value is replaced with the value of the terminal identification signal. The first terminal detecting equality of a terminal identification signal with its leadership selection reference signal assumes leadership and issues a token.

10 Claims, 2 Drawing Sheets

METHOD AND MEANS FOR LEADER CHOOSING ON A TOKEN RING SYSTEM

BACKGROUND OF THE INVENTION

The invention is in the field of token ring systems, in which a token ring transmission network uni-directionally transmits data between terminals attached to the network by passing a data signal, termed a "token", which symbolizes authority to place data on the transmission network.

This invention particularly relates to a method and means for responding to loss of a token in a token ring network by choosing a leader terminal having the responsibility for regenerating the token and placing it on the transmission network.

Token ring systems are well understood in the art, and involve the use of a looped, uni-directional transmission system which connects a plurality of terminals for data exchange. A prior art token ring network is illustrated in FIG. 1 and consists of a set of receive/send (R/S) units 10, 12, 14, and 16, interconnected by uni-directional transmission links 10, 12; 12, 14; 14, 16; and 16, 10. The system is looped in that each send unit uni-directionally transmits over a respective link to the receive unit of one adjacent terminal. The receive unit's terminal has provision for providing the received information to the terminal's send unit so that the information is forwarded to the next adjacent terminal, and so on, until the information is eventually propagated around the ring, back to the receive unit of the originating terminal.

The prior art token ring system of FIG. 1 includes four terminals identified as a, d, s, and n, wherein the alphabetic character associated with each terminal also represents a unique identification code having a value with a magnitude which is relative to the magnitudes of the other terminals. In this regard, the identification code magnitudes of the prior art terminals of FIG. 1 have the relationship $a < d < n < s$.

The system of FIG. 1 is a "token passing" system in that any one of the terminals a, d, n, s is enabled to place data on the token ring network when it obtains a signal having a unique bit pattern called a "token". In FIG. 1, the token is continuously circulated in a clockwise direction in the token ring network. When the token is received at a terminal having data available for transmission, the terminal inserts the data into the token, changes the token's configuration to indicate that it is unavailable, identifies itself and the terminal which is to receive the data, and retransmits the altered token on the token ring network.

The token is circulated on the token ring network until it arrives at the designated receiving terminal, where the data is read, and the token, once again, is forwarded. When the token arrives back at the sending terminal, the data is removed, and the token is altered to an available state and retransmitted on the ring.

Token passing protocols may vary, to some extent, from the procedure outlined above. However, all share the common characteristics of uni-directional transmission in a closed-looped transmission system to which access is obtained according to a protocol based upon a circulating token.

In token ring systems, a problem commonly arises when terminal failure or system noise obliterates or alters a circulating token. To recover synchronicity and reimplement the data transfer protocol, a new token must be generated to replace the lost or altered one. This can be done by designation of a master terminal having primary responsibility for token generation, system synchronization, and protocol oversight. Of course, if such a master terminal fails, the system will either fail totally or recover in a reduced-capacity state by transfer of master terminal duties to a subservient terminal.

In other token ring systems, system oversight and control is transferrable, with responsibility for token regeneration allocated according to a democratic procedure. In such systems, an algorithm or procedure is invoked to designate a "leader" terminal having responsibility for maintenance of a circulating token, and for regeneration of a lost or altered token.

Since a token ring network is intended to provide a high degree of communications availability, a token regeneration scheme must provide fast recovery from loss of a token in the form of speedy token regeneration. Preferably, token regeneration is preceded by selection of a leader terminal, following which the selected leader generates a new token. Implicit in this process is that leader selection be rapid, unambiguous, and as simple as possible.

The prior art procedures for token regeneration are based upon circulation of terminal identification codes in the event of token loss. In one procedure, all healthy terminals place their own identification codes on the token ring and forward all received identification codes. The first terminal to recognize its own code interrupts the procedure and generates the token. In another procedure, each terminal retransmits only identification codes having a predetermined magnitude relationship with its own identification code. Thus, for example, each terminal will retransmit only an identification code having a greater magnitude than its own. In this scheme, the first terminal receiving its identification code becomes the leader.

SUMMARY OF THE INVENTION

In the specific embodiment of this invention, loss or non-conventional alteration of a token stimulates a leadership selection procedure in which any terminal sensing token loss immediately places a leadership selection frame on the ring which contains its own identification. During the procedure, each terminal receiving a leadership selection frame inspects the terminal identification and compares it against a stored leadership reference value. If the terminal identification in the leadership choosing frame equals the leadership reference value, the leadership mantle falls upon that terminal. If the terminal identification in the leadership choosing frame has a magnitude greater than the leadership reference value, the leadership reference value in the terminal is changed to equal the terminal identification value. Thus, each terminal maintains or increases its stored leadership reference value in response to a succession of terminal identification codes which are circulated on the ring, until a leadership reference/terminal identification code match occurs.

This procedure does not wait until a terminal recognizes its own identification code. Therefore, it is faster than the prior art leadership selection protocols based upon terminal self-recognition. The procedure is flexible in that it allows leadership to be transferred in the event of system malfunction. Moreover, the change in the leadership reference value in response to a magnitude difference ensures that the protocol will unambiguously select a single leader.

Of course, it is not intended that the invention be limited to an increasing magnitude response. Indeed, the leadership choosing protocol of this invention is validly practiced by changing the leadership reference value in response to a lower magnitude terminal identification code.

The invention is practiced in a token ring system for interconnecting a plurality of terminals and concerns a method for leadership selection. The method of the invention involves, first, at a first terminal in the system, identifying an event which initiates the procedure, and then generating and transmitting in the token ring system a succession of signals to select a system leader. Each of these signals in the succession has a terminal identification characteristic which identifies a respective one of the system terminals. The succession of signals is received at the first terminal and the following sequence is performed in response to identification of the starting event:

(a) leadership selection reference signal is stored;

(b) a signal from the succession of signals is received;

(c) the terminal identification characteristic of the received signal is compared with the leadership selection reference signal;

(d) if the terminal identification characteristic of the received signal matches the leadership selection reference signal, a token is generated at the first terminal and circulated in the system; otherwise, (e) steps (a)-(d) are performed.

The procedure of the invention further includes the step of, after step (d), and before step (e),:

(d$_i$) if the terminal identification characteristic of the received signal has a particular magnitude relationship with the leadership selection reference signal, the leadership selection reference signal is changed to equal the value of the terminal identification signal.

This method further includes inspection of the signal obtained in step (b), and if the characteristics include token characteristics, the sequence is terminated. Otherwise, the sequence is continued.

It is, therefore, the primary objective of the invention to choose a leader terminal in a token ring system in which the token has been lost.

A further objective is to have the identified leader regenerate the token and transmit it on the system.

A significant feature of the system is that leadership is conferred on the first terminal to detect a second occurrence of the same terminal identification in a sequence of signals transferred in the token ring system to select a system leader.

Other objectives, significant advantages, and important features of this invention will become evident upon a reading of the detailed description of this invention with reference to the below-described drawings.

DETAILED DESCRIPTION OF THE PREFERRED EMBODIMENT

In this application, it is assumed that token ring technology is well-developed, and that an in depth lexicography of token ring terms has developed. In this regard, reference is given particularly to the DICTIONARY OF COMPUTING, copyright 1987, International Business Machines Corporation, for the terms "token", "token access control", "token passing", "token passing procedure", and "token ring network". See also definitions for "master node control", "event", "time-out", and "time-out control".

Figure 2:
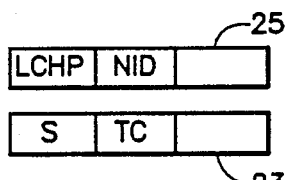
FIG. 2 illustrates communication frame formats used in the practice of this invention.

Reference is also made to U.S. Pat. No. 4,539,679 entitled "SYNCHRONIZATION IN A COMMUNICATION NETWORK OF INTERCONNECTED RINGS", assigned to the assignee of this application, and incorporated herein by reference. In the incorporated patent, FIG. 2 illustrates a data format used for token ring information exchange. The prior art also has provision for token ring data formatting logic which interprets and constructs data structures employed in a token ring system for inter-terminal transmission of data on a token ring network.

In understanding the practice of this invention, structures and procedures are known for making failed or non-functional terminals "transparent" and for reconfiguring a transmission ring upon the failure of a ring component.

TABLE I

| | Leader-Choosing Protocol | |
|---|---|---|
| 197 | IF awake by TIME-OUT | /* No leader*/ |
| 198 | THEN Name-ID: = my name | /* initial value is my name*/ |
| 199 | ELSE Name-ID: = name received | /* initial value is name in message received*/ |
| 201 | Your-Temp-ID := Name-ID SEND Name-ID | /* initial value*/ /* along the ring to your neighbor*/ |
| 203 | RECEIVE Name-ID | /* your predecessor's name*/ |
| 204 | IF Name-ID is a token | /* there is a new leader*/ |
| 205 | THEN BEGIN | |
| 206 | Resend the token | /* return to normal operation*/ |
| 207 | exit the protocol | |
| 208 | IF Name-ID = Your-Temp-ID | /* your previous value*/ |
| 209 | THEN BEGIN | /* you are the new leader*/ |
| 210 | Become a leader | |
| 211 | Create and send a token | /* return to normal operation*/ |
| 212 | exit the protocol | |
| 213 | ELSE | |
| 214 | IF Name-ID>Your-Temp-ID | /* replace your value*/ |
| 215 | Then Your-Temp-ID :=Name-ID | |
| 216 | GOTO 202 | |

In Table I, the leader-choosing protocol of the invention is presented in a pseudo-code form. Those skilled in the art of computer programming will appreciate that this pseudo-code representation can be embodied in a variety of language- and system-specific structures.

For an understanding of the invention as embodied in Table I, refer first to FIG. 2 in which two message frame formats are illustrated. A first message frame format is a standard one for a token frame, and is indicated by reference numeral 23. For the standard token frame, reference is given to the example illustrated in FIG. 2 of the incorporated U.S. patent. The header of the token frame 23 includes start delimiter bytes S and a transport control field TC, which includes the token. Following the transport control field is an identification field ID in which destination and originating addresses are placed. For the purposes of this invention, a terminal's address is considered to be equivalent to its identification, and the numerical representation of the address is the terminal's identification code.

A leadership choosing protocol (LCP) frame is indicated in FIG. 2 by reference numeral 25. This frame includes a unique header field LCPH and a field for containing the terminal identification (TID) code of a respective terminal on the system.

The frame formats of FIG. 2 include unique characteristics in the form of the TC, and NID fields of the frames 23 and 25. In the invention, a terminal will begin the leadership choosing protocol upon detection of an LCP frame 25, and will operate according to the protocol in response to the magnitude value in the NID field. A terminal will exit the protocol of the invention upon detecting the token frame 23 of FIG. 2.

In Table I, it is assumed that a programmed terminal processor can distinguish between an LCP frame and a token frame. During the leader-choosing protocol of Table I, the processor of terminal a receives LCP frames which include terminal identification codes (names) from its predecessor on the ring, terminal n, and sends names in LCP frames to its successor on the ring, terminal d. The macro commands RECEIVE and SEND perform these actions. During execution of the protocol, a terminal processor can send messages only to its successor and receive messages only from its predecessor, since there is no token. When a token is generated and transmitted in the token ring system, it will "clean up" the ring by successively resetting the terminals to normal operation.

Table I represents the leadership protocol programming which is present in the processor of each terminal. The protocol is initiated by one of two events. The first event occurs when the terminal detects that a maximum token transmission time has been exceeded. Relatedly, it is assumed that loss of a token will be indicated by elapse of an arbitrary time, the magnitude of which is sufficient to permit the slowest possible circulation of the token through the ring. This time is measured by conventional time-out procedures. Thus, if the terminal is awake when its time-out period expires, then the procedure is entered in step 197 of Table I with the terminal assuming that the previous leader has been lost, as indicated by loss of token.

The alternative event for initiating the procedure of Table I is receipt by the terminal of an LCP frame having the format illustrated in FIG. 2.

Thus, if the terminal's time-out period is exceeded in step 197, then the terminal will generate an LCP frame with its own identification in the NID field. The terminal prepares for this by entering its identification (my name) into a storage location, Name-ID, where the NID value for an LCP frame is stored. This is step 198.

Otherwise, if the procedure is initiated in step 199 by receipt of an LCP frame, the terminal stores at Name-ID the terminal identification code in the NID field of the received frame.

Initially in the protocol, in step 201, the terminal stores a leadership selection reference value as a temporary identification in a location TEMP-ID. In step 201, the leadership selection reference value is, initially, the terminal's identification (if step 198 is executed), or the terminal identification code contained in the NID field of the first LCP frame received (in step 199).

Following storage of the leadership selection reference value in TEMP-ID, the terminal generates and transmits on the ring an LCP frame to the next downstream terminal. The terminal identification code in the NID field of the LCP frame is the value stored at Name-ID.

Once the leadership choosing protocol of Table I is invoked, the terminal prepares to receive a succession of frames, which may be LCP or token frames. In either case, the second field of the received frame is inspected in step 203. If the second field is a token, a new leader has been selected and the terminal exits the protocol by first resending the token in a return to normal operation, and then terminating protocol execution in step 207.

Alternatively, if the received frame is a LCP frame, the terminal identification code in the NID field of the frame is compared against the leadership selection reference value stored in TEMP-ID. If the magnitudes are equal, the terminal accepts leadership in steps 209 and 210, and undertakes its first act as leader by creating and sending a token frame in step 211. Once the terminal accepts the leadership role, it exits the protocol in step 212.

Alternatively, in steps 213-215, if the received LCP frame contains a terminal identification code in the NID field greater than the magnitude of the leadership selection reference value stored in TEMP-ID, the leadership reference value is changed by storing the terminal identification code contained in the ID field of the received LCP frame in TEMP-ID as the new leadership reference value. The procedure is then looped back to step 202 by way of step 216.

Of course, in step 214, the magnitude comparison could be reversed, resulting in replacement of the leadership reference value by a lower magnitude terminal identification code in the NID field of a received LCP frame.

Figure 3:
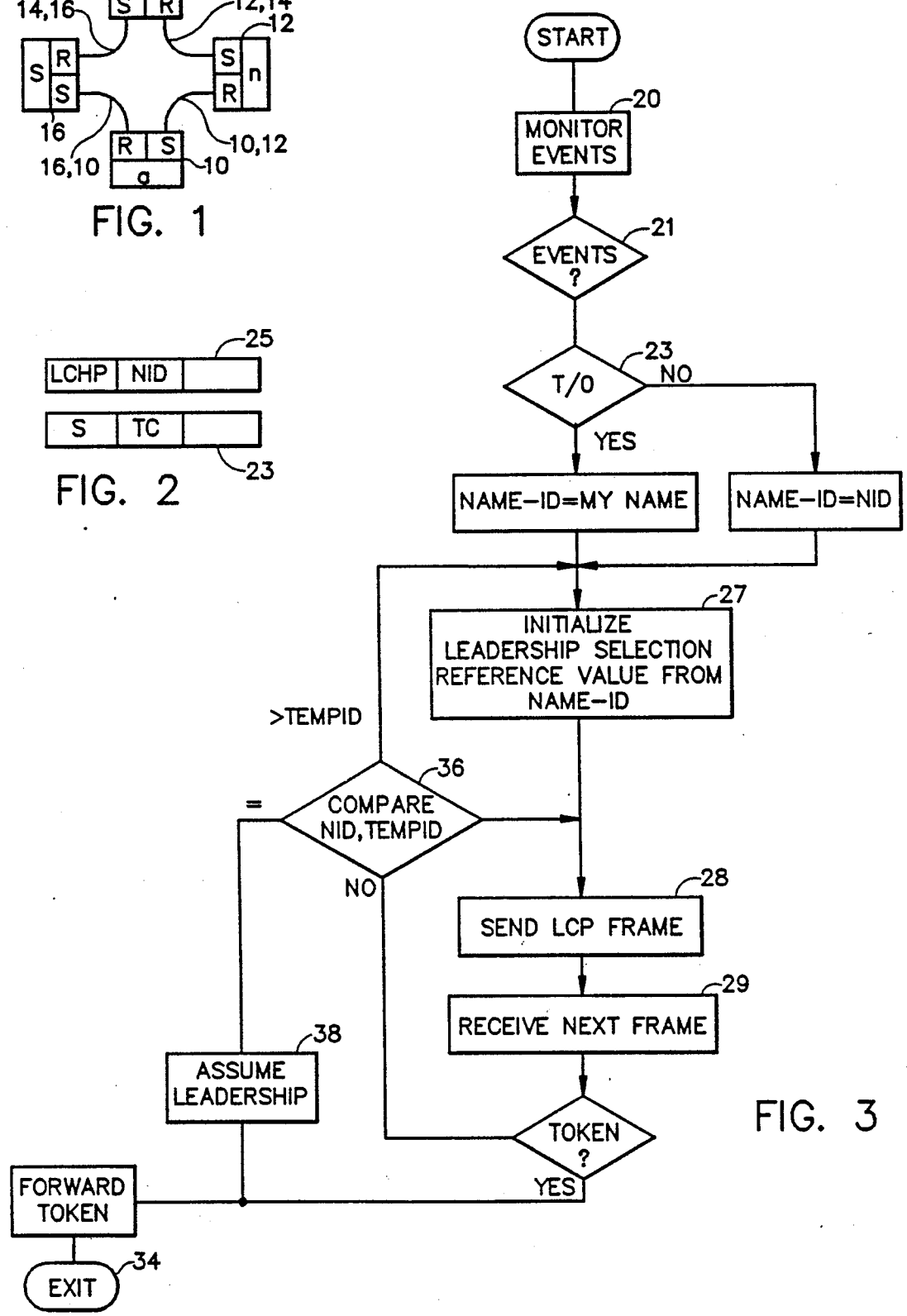
FIG. 3 is a flow diagram illustrating the procedure of the invention for selecting a leader terminal, which is invoked in response to token loss.

The protocol of Table I is illustrated in conventional computer flow diagram form in FIG. 3. In FIG. 3, the protocol initiates, and in step 20 monitors both the time-out function and the format of incoming frames to determine whether an event for initiating the leadership choosing protocol has occurred. The two events, of course, are expiration of the time-out or detection of LCP frame. For so long as neither event is detected, the negative exit is taken from the decision 21 and the monitoring is continued in step 20.

When one of the events is detected, the protocol exits the decision 23 based upon whether the event was expiration of the time-out (TO) or detection of an LCP frame. If TO, the positive exit is taken from the decision 23 and the terminal's identification code (my name) is entered into the Name-ID storage location. Otherwise, the negative exit is taken from decision 23, in which case the terminal identification code in the NID field of the received LCP frame is entered into Name-ID. In step 27, the leadership reference value is established by entry into Temp-ID from the Name-ID location. Then, the terminal sends a LCP frame with the value in Name- ID field entered into the NID field. In step 29, the next frame is received, if it contains a token, the positive exit is taken from decision 31, the token frame is forwarded in step 32, and the terminal exits the leadership protocol in step 34.

If the received frame is not a token frame, the terminal identification code in the NID field of the received LCP frame is stored at Name-ID and the value is compared with the leadership reference value. If the values are equal, the protocol exits from comparison 36 through step 38 in which a leadership latch (L) is set, indicating that the terminal has assumed the leadership role, a token frame is generated with a token in it, and sent in step 32 and the protocol is exited in step 34.

In comparison 36, when the value in the Name-ID field is greater than the leadership reference value in the TEMP-ID location, the protocol loops through step 27, if the value is less than the leadership reference value, the loop out of the comparison 36 is through step 28.

Figure 1:
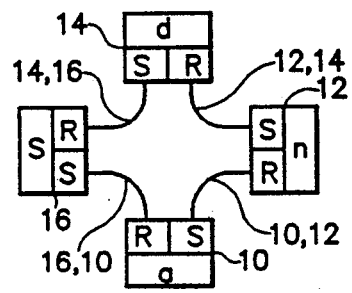
FIG. 1 illustrates a prior art token ring system.
Figure 4:
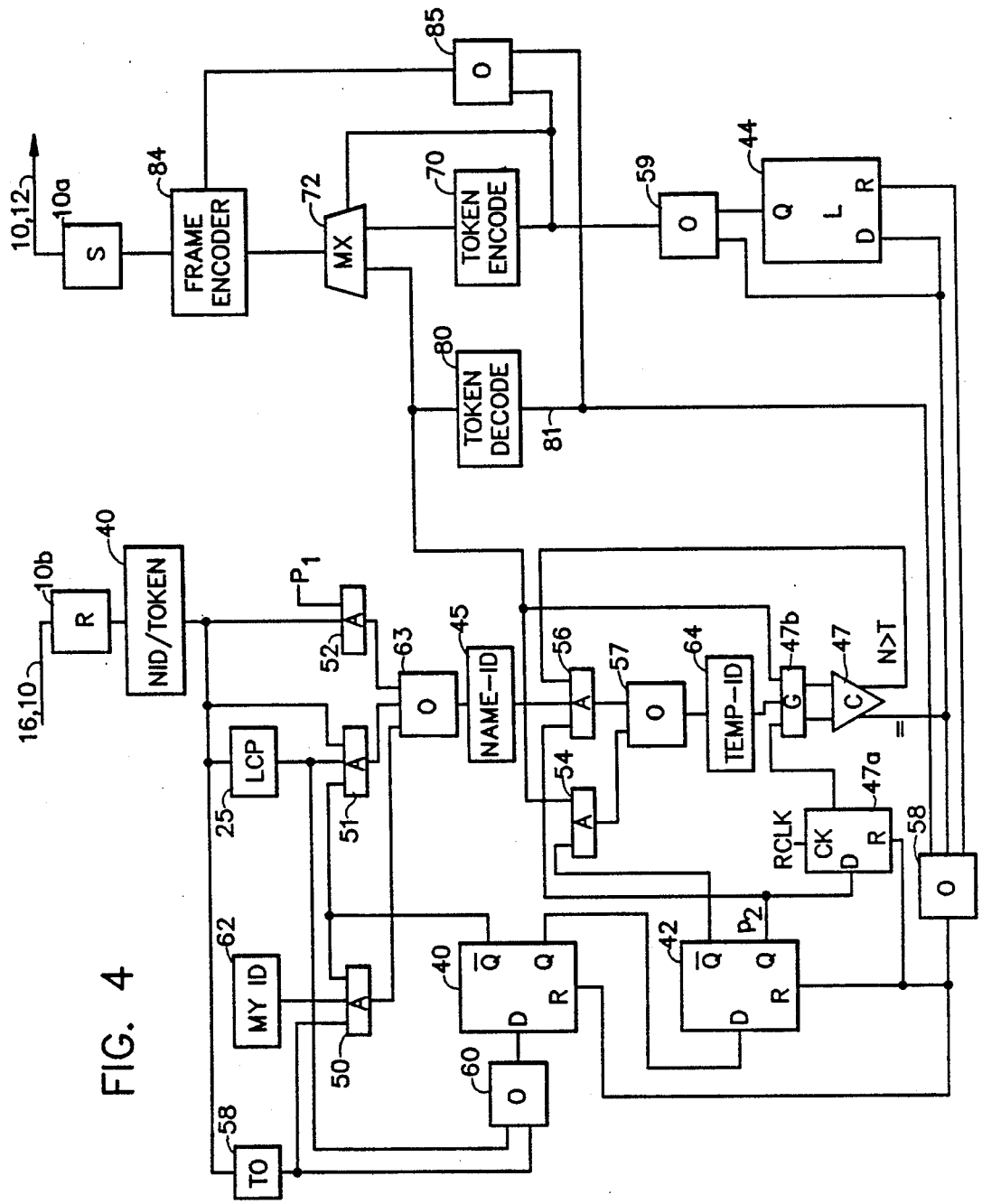
FIG. 4 is a schematic diagram illustrating a terminal mechanism for performing the method of the invention.

FIG. 4 illustrates a terminal mechanism which executes the leadership protocol illustrated in Table I and FIG. 3. In FIG. 4, the mechanism is illustrated as residing in terminal a, it being understood that the mechanism is identical in all other terminals of the token ring system of FIG. 1. In FIG. 4, a frame is received on 16, 10 through the receiver mechanism (R) 10b. Initially, prior to commencement of the leadership-choosing protocol, and assuming that the terminal is not currently the leader, the latches 40, 42, and 44 are all reset. The latches 40 and 42 control a register pipeline comprising registers 45 and 46. Register 45 stores the second field of a received frame which can be either a terminal identification code, if the frame is LCP, or a token, otherwise. During execution of the protocol, the register 45 contains the Name-ID value. The leadership selection reference value is stored in the register 46, whose address is that for the Temp-ID location.

Initially, the inverted output of the latch 40 is active, providing an active gating signal to AND circuits 50 and 51. The AND circuit 52 is initially deactivated by the positive output of the latch 40 $P_1$, which is reset. Since the latch 42 is reset, its inverse output positively gates the AND circuit 54, while its positive output disables the AND circuit 56.

Thus initialized, the leadership choosing mechanism of FIG. 4 is in a state which is prepared to respond to one of the two events which initiates the leadership choosing protocol. Assume, first, that the time-out expires. In this event, the time-out (TO) circuit 58 activates a time-out signal which is fed to an OR gate 60 and to the AND gate 50. In this case, the AND gate feeds the terminal identification code for this terminal (my ID) from a register 62 through OR gate 63 into the register 45. This initializes the Name-ID value to the terminal's own identification code. Concurrently, the OR gate 60 provides the active signal from the circuit 58 to the data (D) port of the latch 40, causing the latch to change state on the first clock cycle following time-out. This sets the latch 40, thereby deactivating the AND circuits 50 and 51. Simultaneously, the AND circuit 52 is gated by activation of the $P_1$ signal from the latch 40. The my ID value in register 45 is entered also in register 46 through AND circuit 54 and OR gate 46. This initializes the leadership reference value to MY-ID.

Activation of the latch signal $P_1$ causes the latch 42 to set on the following clock cycle, thereby activating the $P_2$ signal. This removes the gating signal from the AND circuit 54 and positively gates the AND circuit 56.

Now, the second field of each frame registered at 40 is passed through the AND circuit 52 and the OR gate 63 to the register 45. The contents of the register 45 are compared with those of the register 46 in a conventional digital comparator (C) 47. If the magnitude of the value stored in register 45 exceeds the magnitude of the leadership reference value in register 46, the output N>T is activated by the comparator 47, causing the contents of the register 45 to be moved on the transfer path 56, 57 into the register 46.

The comparator 47 is constrained from operating until after receipt of the first frame following setting of the latches 40, 42. This suppresses a false=output resulting from the initial loading of the registers 45 and 46. The constraint is by way of a latch 47a which clocks the output of the latch 42 to a gate circuit 47b in response to a clock signal RCLK which synchronizes circuit activity to receipt of a frame by the receiver 10b. When the output of the latch 47a is positive, the contents of registers 45 and 46 are provided to the comparator 47.

If the register contents are equal, the =output of the comparator 47 is activated. In this case, the OR gate 58 provides the activated signal to the asynchronous reset (R) terminals of the latches 40 and 42, resetting the latches, and deactivating the pipeline consisting of the registers 45 and 46. Activation of this output is also fed to the data (D) port of the leadership latch 44, resulting in setting the latch to indicate that the terminal is now the leader. The OR gate 5a collects the positive output of the leadership latch 44 and the =output of the comparator 47 to activate a token generator 70, whose output is fed to a multiplexer 72. While the terminal is acting as a leader, the output of the OR gate configures the multiplexer 72 to select the token generated by the circuit 70. For so long as the terminal has not been selected as leader, the multiplexer 72 receives the output of the register 45.

Assume now that another terminal has timed out and generated an LCP frame before the time-out circuit 58 activates its output. In this case, the LCP frame is received in the register 40 and provided to a LCP frame decoding circuit 75. The circuit 75 provides a positive output to the AND circuit 51 in response to the LCP frame in the decoder. This positive output is fed through the OR gate 60, resulting in the sequential activation of latches 40 and 42. In addition, the contents of the NID field of the LCP frame in the register 40 are fed through the AND gate 51 into the register 45. These contents are also fed from the register 45 through the AND gate 54 to the register 46. Thus, the leadership-choosing protocol will have been initiated by response to an LCP frame by entry of the terminal ID code in the received frame into the Name-ID register 45 and the Temp-ID register 46 in keeping with the protocol. Inspection of FIG. 4 will assure the skilled artisan that, for each LCP subsequently received, the value in its NID will be fed to the register 45 and compared with the leadership reference value in the register 46. If the magnitude of the contents of the register 45 exceeds the magnitude of the contents of register 46, the leadership reference value will be changed by entry of the contents of the register 45 into the register 46.

Assume now that a previous terminal has accepted leadership and sent a token frame. In this case, the frame is entered into the register 40, and entered into the register 45 through the gate path 52, 63. In the circuit of FIG. 4, the contents of the register 45 are decoded by a token decoding circuit 80. If the register 45 contains a token extracted from a token frame, the token decoding circuit 80 activates an output on signal line 81, which is fed to the OR gate 58, causing asynchronous resetting of the latches 40 and 42. This terminates the leadership choosing protocol in the same manner as detection of equal values in the registers 45 and 46. For transmission of LCP and token frames in protocol of this invention, an encoding circuit 84 operates conventionally to receive the output of the multiplexer 72, and encode it into a frame format in response to an OR gate 85. Until the terminal is selected as the leader, the input to the encoder circuit 84 is always the contents of the register 45, which may contain a terminal identification code or a token. For so long as the leadership choosing protocol is being conducted and the register 45 contains no token, the output of the OR gate 85 will be inactive. For so long as the output of this gate is inactive, the encode circuit 84 encodes the contents of the register 45 into a frame having the LCP format of FIG. 2. Assume now that the terminal mechanism of FIG. 4 has received a token frame. In this case, the register 45 contains the token and the token decoding circuit 80 provides an active output. The active output is fed by the OR gate 85 to the encoder 84. In response to the activation of the output of gate 85, the encode circuit places the token in the register 45 into a frame having the token format of FIG. 2.

Similarly, when the mechanism of FIG. 4 indicates that the terminal has been selected as the leader, the active output of the OR gate 59 is fed by the OR gate 85 to the encoder circuit 84 at the same time that the multiplexer 72 is configured to select the token generated by the circuit 70. Now the encoder 84 receives a token from the circuit 70 and encodes it into the token frame format of FIG. 2.

Conventionally, the SEND circuit (S) 10a transmits the frames generated by the encode circuit 84 to the next terminal downstream from terminal a on the link 10,12.

Although the mechanism for leadership selection is presented in FIG. 4 in a structure including discrete logical elements, those skilled in the art will realize that the protocol can be as easily embodied in programmable circuitry in the form illustrated and explained above in reference to Table I and FIG. 3.

Although the examples and embodiments described above implement a leader-choosing protocol based upon the highest-magnitude identification code, this constitutes only one example of the practice of the invention, and other methods can be used, such as a minimal identification code recognition. No matter which significance characteristics are chosen, the invention permits token-ring terminals to dynamically assume leadership once the current leader fails to take charge, without waiting for a system-wide time-out to occur. This provides a major savings in time over the prior art methods.

While I have described a preferred embodiment of my invention, it should be understood that modifications and adapations thereof will occur to persons skilled in the art. Therefore, the protection afforded my invention should only be limited in accordance with the scope of the following claims.

I claim:

1. In a token ring system for interconnecting a plurality of terminals, a method for selection of a lead terminal in response to loss of a token, such method comprising the steps of:
   at a first terminal in said system, identifying an event which initiates a protocol for selecting a system leader terminal, having responsibility for maintenance of a circulating token and for regeneration of a lost or altered token;
   in response to said loss of said token, circulating a succession of signals in said system to select a system leader terminal, each of said signals having a terminal characteristic which identifies a respective one of said terminals;
   receiving said succession of signals at said first terminal; and
   performing the following sequence at said first terminal in response to said event:
   (a) selecting and storing a leadership selection reference signal;
   (b) receiving a signal from said succession of signals;
   (c) comparing the terminal identification characteristic of said signal with leadership selection reference signal; and
   (d) if said terminal identification characteristic of said signal matches said leadership selection signal, generating a token at said first terminal and circulating said token in said system; otherwise,
   (e) performing steps (a)–(d) again.

2. The method of claim 1, further including, after step (d) and before said step (e),:
   (d_i) if said terminal identification characteristic of said signal has a particular magnitude relationship with said leadership selection reference signal, replacing the magnitude of said leadership selection reference signal with the magnitude of said terminal identification characteristic.

3. The method of claim 1, further including:
   inspecting the terminal identification characteristic of said signal obtained in step (b); and
   if said terminal identification characteristic is a token characteristic, terminating said sequence; otherwise,
   continuing said sequence.

4. In a shared transmission loop system in which a plurality of terminals are connected to a shared transmission loop and where any terminal obtains access to said transmission loop in response to a token which is transmitted on said transmission loop, a method for regenerating a token, comprising the steps of:
   at a first terminal connected to said transmission loop, identifying an event indicative of token loss;
   in response to said token loss, transmitting signals on said transmission loop system to generate a token, said signals having terminal identification characteristics;
   at a first terminal:
   selecting a leadership selection reference value;
   receiving said signals;
   iteratively, obtaining the terminal identification characteristics of a signal of said sequence and comparing said terminal identification characteristics with said leadership reference value until said terminal identification characteristics match said leadership reference value; upon which,
   generating a token at said first terminal and transmitting said token on said transmission loop.

5. The method of claim 4, further including, if the terminal identification characteristics of said signal do not equal said leadership reference value, replacing said leadership reference value with the value of said terminal identification characteristics.

6. The method of claim 5, wherein said replacing step includes replacing said leadership reference value with the value of said terminal characteristics only if a predetermined magnitude relationship exists between said leadership reference value and said value of said terminal identification characteristics.

7. The method of claim 4, wherein said identifying step includes timeout detection of token loss at said first terminal.

8. The method of claim 4, wherein said identifying step includes receiving a token loss signal on said transmission loop system.

9. The method of claim 1, wherein said identifying step comprises timeout detection of token loss at said first terminal.

10. The method of claim 1, wherein said identifying step comprises receipt of a signal idicative of token loss at said first terminal.

* * * * *